June 21, 1938.  J. W. SHIELDS  2,121,512
WEATHERPROOF PANEL STRUCTURE AND METHOD OF MAKING SAME
Original Filed May 10, 1935    2 Sheets-Sheet 1
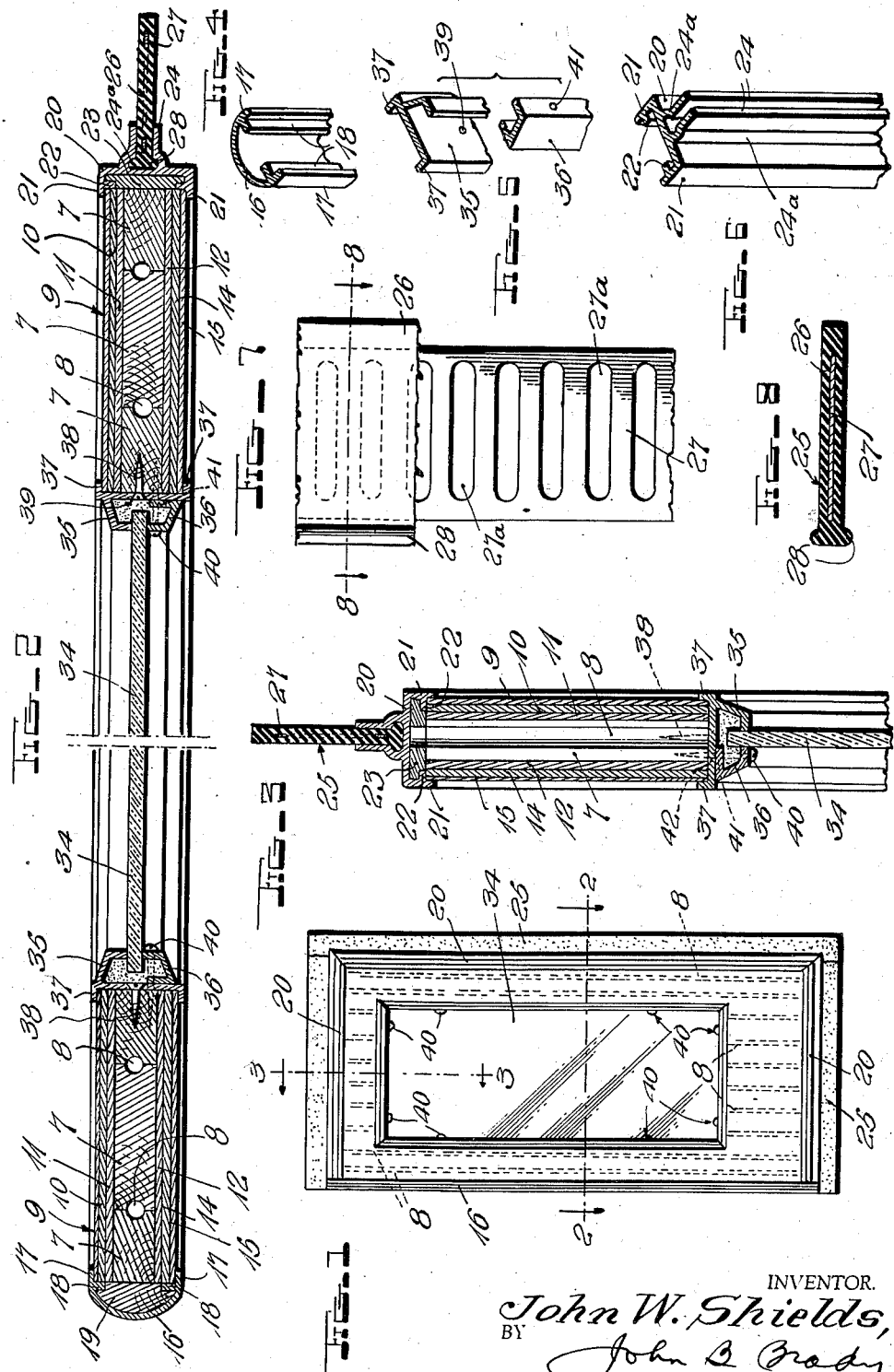
INVENTOR.
John W. Shields,
BY
John B. Brady
ATTORNEY

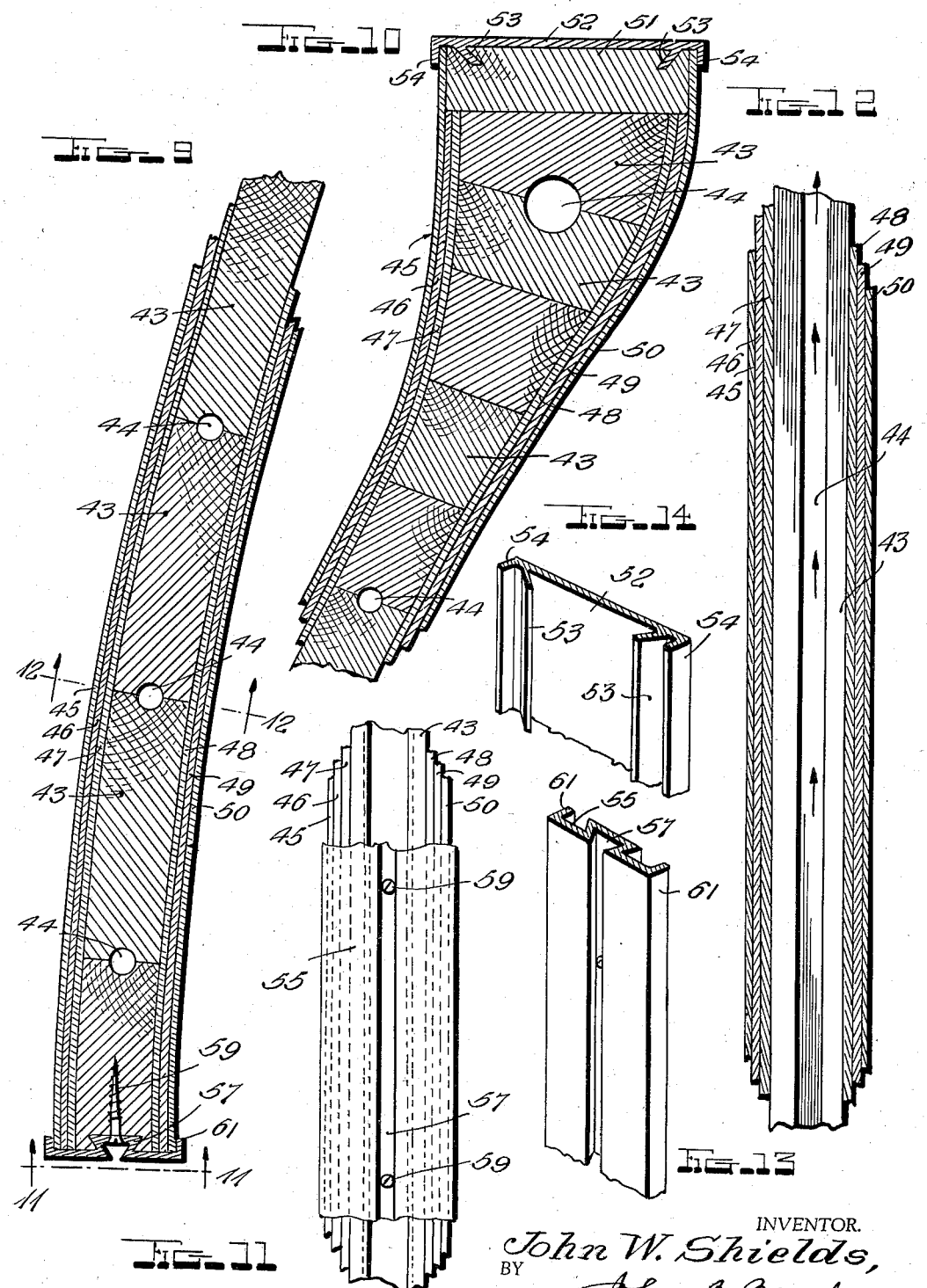

Patented June 21, 1938

2,121,512

UNITED STATES PATENT OFFICE 2,121,512

WEATHERPROOF PANEL STRUCTURE AND METHOD OF MAKING SAME

John W. Shields, Evansville, Ind., assignor, by mesne assignments, to International Door Company, Evansville, Ind., a corporation of Illinois Original application May 10, 1935, Serial No. 20,844. Divided and this application May 9, 1936, Serial No. 78,911

7 Claims. (Cl. 20—35)

My invention relates broadly to panel structures, and more particularly to laminated panel structures having weatherproof, non-porous surface veneers, and a method of making such panels.

This application is a division of my copending application Serial No. 20,844, filed May 10, 1935, for Revolving door construction.

One of the objects of this invention is to provide an improved construction of laminated panel structure having weatherproof surface veneers.

Another object of my invention is to provide a laminated panel structure employing sheets of metal, micarta, "Formica", or of a phenol condensation product, or other weatherproof, nonporous material, as the surface layer thereof.

Still another object of my invention is to provide a laminated panel structure having a metal or composition, nonporous surface veneer and air passages disposed regularly throughout the core structure to facilitate drying of the laminated panel structure which is retarded by the non-porous nature of the surface veneer.

A further object of my invention is to provide a laminated panel structure having a metal or composition nonporous surface veneer and parallel disposed air passages, in the core structure, which are open at their ends during the construction of the panel to facilitate the escape of moisture from the glue or other adhesive used to bind the laminations together.

A still further object of my invention is to provide a method of building laminated panel structures having nonporous, weatherproof surface layers, whereby the panels may be rapidly and efficiently assembled.

Still another object of my invention is to provide a method of drying laminated panel structures having nonporous surface layers during the building thereof by venting the core structure to facilitate the escape of moisture.

A still further object of my invention is to provide a construction of metallic molding having extruded portions thereon, forming interlocking joints with parts of a weatherproof laminated panel structure for insuring a weathertight seal at the edges of the panel structure.

Still another object of my invention is to provide a construction of laminated panel structure having weatherproof surface layers, a metallic molding sealing the edges of the panel, and a flexible weatherstrip mounted in the molding to adapt the panel structure to constitute a weathertight closure for a given opening.

Still another object of my invention is to provide a construction of laminated panel structure having weatherproof surface layers and a metallic molding adapted to seal the edges of the panel, with sections of the molding having abutments formed in the outer surface thereof for mounting glass plates in weathertight connection therewith.

Other and further objects of my invention reside in the construction of laminated panel structures as set forth more fully in the specification hereinafter following, by reference to the accompanying drawings, in which:

Figure 1 is a front elevation of a panel structure embodying the several features of my invention; Fig. 2 is a horizontal sectional view, on an enlarged scale, taken substantially on line 2—2 of Fig. 1; Fig. 3 is a trans-vertical section taken on line 3—3 of Fig. 1; Fig. 4 is a fragmentary sectional perspective view of a metallic molding having integral inwardly extending fastening ribs; Fig. 5 is a similar view of a metallic molding having means for mounting a transparent plate such as glass; Fig. 6 is a similar view of a metallic molding having means for confining a weatherstrip; Fig. 7 is a front elevation of a strip of resilient material showing a steel spring member embedded therein; Fig. 8 is a horizontal section taken on line 8—8 of Fig. 7; Fig. 9 is a horizontal sectional view on an enlarged scale showing in detail the construction of another embodiment of the panel structure of my invention; Fig. 10 is a fragmentary horizontal sectional view showing the structure of a specially formed edge constituting a post embodied in the panel structure; Fig. 11 is a fragmentary vertical view in the direction indicated on the line 11—11 of Fig. 9; Fig. 12 is a vertical transverse section taken on line 12—12 of Fig. 9; Fig. 13 is a fragmentary sectional perspective view of the metallic molding on the edge of the panel portion shown in Fig. 9; and Fig. 14 is a similar view of the metallic molding on the edge of the enlarged panel portion shown in Fig. 10.

The panel structure of my invention employs surface layers which are impervious to moisture and weatherproof. The construction of laminated panel structures having surface layers which will not permit the escape of moisture has heretofore been difficult and expensive because of the time required for completely drying the panel after the non-porous surface veneers have been glued in place. My invention provides a method of building such panel structures by venting the core in order to facilitate the escape of moisture, and my invention further provides a finished panel structure having weathertight edges sealed with metallic molding. The panel structure of my invention may be employed in the construction of doors or other closures, in which case provision is made for mounting a weatherstrip in the molding on the outer edge of the closure panel, or for mounting a glass plate in a molding provided around an opening in the panel. The panel structure of my invention may also be employed in stationary wall structures, such, for example, as the segmental abutments of revolving doors, in which case also metallic molding of special form may be provided on the edges of the panel structure. In one form of my invention, a post structure is provided at the edge of the panel integral with the panel structure by employing an enlarged core section and extending the surface layer of the laminated panel structure over the enlarged core section. A metallic molding is provided on the post structure to effect a completely weathertight unit.

My invention will be more fully understood by reference to the drawings in which the panel structure shown particularly in Figs. 1–3 comprises a wood core having aligned sections 7 abutting edge to edge with longitudinally extending ports 8 intermediate the junctions of the abutting edges of the sections 7, and forming ventilating passages through the panel structure. The ventilating ports may be of any shape in cross-section, that is, round, square, or otherwise, and the purpose of the ports is to permit the escape of moisture from the wood core after the laminated sheets of material have been assembled over the opposite surfaces of the wood core structure. In large panel sizes, the escape of moisture is a highly important problem, the moisture having to travel to the edges of the panel inasmuch as it cannot escape through the non-porous surface layer. Ordinarily the moisture would have to travel from the middle of the panel outward to the edge, which distance might well be as great as five feet, whereas according to my invention the moisture need travel only a few inches to the nearest air duct, through which it is rapidly carried to the outside.

The wood core 7 thus equipped with a multiplicity of parallel extending ventilating passages is provided with a plurality of surface laminations extending on each side of the core structure. For this purpose, I may employ sheets of wood, metal, Formica, micarta, or sheets of a phenol condensation product or other material. The laminated sheets of the same or different materials are represented generally at 9, 10 and 11, and 12, 14 and 15 on opposite sides of the wood core structure 7. The ends of laminated sheets are maintained in position with respect to the core structure 7 in a very special manner by means of a metallic molding. The metallic molding may be formed along one edge of the panel as indicated at 16, with a curved face having side portions 17 coextensive therewith and inwardly directed extruded portions 18 which serve as abutments for the edges of the laminations in cooperation with the filler member 19. The other edges of the panel may be provided with a metallic molding 20 having coextensive side portions 21 which extend over the edges of the laminations and which are provided with inwardly directed extruded lug portions 22 which serve as edge abutments for the laminations in coaction with the filler member 23. The molding 20 is provided with a pair of parallel extending jaws 24 having recesses 24a therein for gripping the weather strip 25.

The weather strip 25 is shown more particularly in Figs. 7 and 8 as comprising the resilient body structure 26 having a resilient embedded core 27 which serves to maintain the weather strip in a substantially upright position and allows the weather strip to function over a relatively long period of time. The resilient embedded core 27 is relatively flat and is reduced in mass by reason of the apertures 27a which are stamped therein. Also, the apertures 27a allow resilient material of the body structure 26 to be vulcanized around the resilient metal insert 27. The resilient body structure 26 is provided with an enlarged longitudinally extending peripheral edge portion 20a which is gripped in the recesses 24a formed in the parallel extending jaws 24. The ability of the weather strip shown at 25 to remain in a co-extending plane with the panel insures a weathertight joint between the panel and any frame structure with which it may be associated.

A glass plate may be provided for the panel, as shown at 34, and secured within the plane of the panel structure by means of molding formed by coacting metallic members 35 and 36. The coacting members are illustrated more particularly in Fig. 5. It will be seen that member 35 comprises a metallic molding having side portions 37 which engage the laminated sheets on opposite sides of the panel structure. As shown in Fig. 3, the molding is secured centrally by suitable screws 38 passing through apertures 39 in the molding to the wood core 7. The mold section 36 is secured to the core 7 and disposed in relation to the mold section 35 by means of screws 40 which pass through apertures 41 in mold section 36 and apertures 42 in mold section 35 and are embedded in wood core 7. The coacting mold sections 35 and 36 serve to grip a rubber, felt, or putty-like core therein which serves as a seal against the seepage of moisture around the peripheral edges of glass plate 34. The assembly of the mold sections is extremely simple and the construction is inexpensive.

Panels constructed in accordance with my invention may be formed in arcs as shown in Fig. 9, and may be provided with metallic molding of any desired configuration, adapted to seal the edges of the panel. The molding shown on the edge of the panel in Fig. 9 and in perspective in Fig. 13 comprises a plate member 55 including a central longitudinally extending dove-tail groove 57 and a pair of formed edges 61 adapted to overlap the ends of the outer laminations on the panel to retain in position and provide a moisture-proof seal for the edge of the panel. Screws, shown generally at 59 in Figs. 9 and 11, are provided to secure the molding 55 to the panel. The molding shown applied to the panel in Figs. 9 and 11, and more particularly in Fig. 13, is a special form adapted to receive a locking member (not shown) which joins the molding shown with a similar molding on an adjacent panel structure, as is more fully described in my copending application Serial No. 20,844, of which this application is a division. The panel shown in Fig. 9 comprises a core made up of sections 43 having grooves in their abutting edges forming the passages 44. Laminations 46, 47, 48 and 49 are laid on the core structure, and the non-porous surface veneers 45 and 50 are laid on either side of the panel. Fig. 12, which is a vertical section between two of the core sections 43, on line 12—12 of Fig. 9, shows the ventilating passage 44, and arrows to indicate how the moisture is rapidly removed from even the central portion of the panel structure of my invention.

Fig. 10 shows a particular feature of my invention in the construction of a post portion for the panel structure integral with the panel. As applied to the panel structure of Fig. 9, the core sections 43 near the edge are enlarged in size (and a correspondingly larger ventilating passage is provided) and formed into a post structure having an exterior surface joining smoothly with the panel. I provide a filler member 51 at the edge of the post, and the outer laminations 45 and 50 are extended over the filler member 51. A metallic end plate 52 having extruded prongs 53 and side engaging portions 54 is mounted on the exposed face of the filler member 51, the prongs 53 serving to anchor the plate 52 with respect to the filler member 51. The side portions 54 overlap the laminations 45 and 50 and provide a weathertight, moisture-proof seal on the post structure. The construction of the end plate 52 is shown more clearly in Fig. 14, from which it will be observed, in view of Fig. 10, that no screws are required for securing the end plate with respect to the post.

While I have described my invention in certain preferred embodiments, I fully understand that modifications may be made in the construction and the form of the panel structures disclosed, and I intend no limitation upon my invention except by the scope of the appended claims.

What I claim as new and desire to secure by Letters Patent of the United States is as follows:

1. A door panel comprising a core structure, sheets of laminated material secured to the opposite surfaces of said panel, a metallic molding disposed peripherally of said core structure, and means extending from said metallic molding entering said core structure, and forming abutments for the edges of said sheets of laminated material.

2. A door including a core structure, laminated sheets of material extending over opposite faces of said core structure, a metallic molding peripherally engaging said core structure, members extruded from said metallic molding and entering said core structure forming edge abutments for said laminated sheets of material, and members integrally connected with said molding extending in planes substantially parallel with the central axis of said core structure, and a resilient sheet of material gripped between said members whereby said resilient sheet of material is maintained in a plane substantially coincident with the central axis of said core structure.

3. Weatherproof laminated panel structure comprising a core structure having parallel extending ducts, a plurality of veneer layers attached to both sides of said core structure, the surface veneers being of non-porous material, said ducts adapted to ventilate said core structure in the assembly of said core and said veneer layers, a metallic molding fixedly engaging the periphery of said core structure, and members integrally connected with said metallic molding and extending over the edge portions of said non-porous surface veneers for preventing the seepage of moisture into said core structure.

4. In combination with a laminated panel having an opening therein, a metallic molding having extruded members engageable with the outer laminations on opposite sides of said panel, means for securing said molding to said panel on the periphery of said opening, a plate member, and means for mounting said plate member in said opening including a flange integral with said molding and projecting in the plane of said molding to provide an abutment for said plate member, said flange having a recessed portion away from said plate member adapted to contain a plastic medium maintained in contact with said plate member, a coacting abutment member separate from said molding, and means for mounting said coacting abutment member in fixed position opposite said flange with said plate member therebetween.

5. The combination defined in claim 4, with said coacting abutment member comprising an extruded U-shaped member having aligned apertures in the opposite flanges at spaced intervals along the length thereof, said member adapted to contain a plastic medium maintained in contact with said plate member, and to be mounted on said panel by screws extending through the aligned apertures and into said panel.

6. A door structure comprising a frame section having a weatherproof surface and weathertight edge moldings, a weatherstrip member secured in the molding on free edges of said frame section, and a rounded molding adapted to seal the door closure on the supporting edge of said frame section.

7. Weatherproof laminated panel structure comprising a core structure having parallel extending ducts, a plurality of veneer layers attached to both sides of said core structure, the surface veneers being of non-porous material, said ducts adapted to ventilate said core structure in the assembly of said core and said veneer layers, and non-porous molding means mounted on the periphery of said core and engaged with the edges of said non-porous surface veneers in sealing relation for preventing the seepage of moisture into said core structure.

JOHN W. SHIELDS.